(12) United States Patent
Readler

(10) Patent No.: US 10,556,810 B2
(45) Date of Patent: Feb. 11, 2020

(54) SOLAR STERILIZATION APPARATUS FOR INCREMENTAL BOILING

(71) Applicant: Blaine Clifford Readler, San Diego, CA (US)

(72) Inventor: Blaine Clifford Readler, San Diego, CA (US)

( * ) Notice: Subject to any disclaimer, the term of this patent is extended or adjusted under 35 U.S.C. 154(b) by 0 days.

(21) Appl. No.: 15/972,133

(22) Filed: May 5, 2018

(65) Prior Publication Data

US 2019/0337820 A1    Nov. 7, 2019

(51) Int. Cl.
*C02F 1/14*     (2006.01)
*C02F 1/04*     (2006.01)
*C02F 103/00*   (2006.01)

(52) U.S. Cl.
CPC ............... *C02F 1/14* (2013.01); *C02F 1/048* (2013.01); *C02F 2103/00* (2013.01); *C02F 2201/002* (2013.01)

(58) Field of Classification Search
None
See application file for complete search history.

(56) References Cited

U.S. PATENT DOCUMENTS

| | | |
|---|---|---|
| 3,655,517 A | 4/1972 | Hensley |
| 4,219,387 A | 8/1980 | Gruntman |
| 4,681,132 A * | 7/1987 | Lardner ............... A61M 39/24 137/271 |
| 4,978,458 A | 12/1990 | Inagaki |
| 5,053,110 A | 10/1991 | Deutsch |
| 5,676,128 A | 10/1997 | Cowart |

FOREIGN PATENT DOCUMENTS

WO    WO-2009125702 A1 *    10/2009    ........... B01D 1/0035

* cited by examiner

*Primary Examiner* — Renee Robinson
*Assistant Examiner* — Derek N Mueller

(57) ABSTRACT

A water sterilizer powered by solar energy is described. A first check valve allows an increment of untreated water to flow from a reservoir into a boiling chamber where it is heated to boiling, and thus sterilized, by focused solar energy. A second check valve with a higher cracking pressure than the first valve remains closed, holding the increment of untreated water in the boiling chamber until the pressure of steam forces the second valve open, thus evacuating the chamber of now-sterilized water. Once the chamber is evacuated, the second valve automatically closes, and the first valve automatically opens, allowing another incremental sterilizing cycle to begin.

9 Claims, 7 Drawing Sheets

SOLAR STERILIZATION APPARATUS FOR INCREMENTAL BOILING

CROSS-REFERENCE TO RELATED APPLICATIONS

Not Applicable.

SEQUENCE LISTING

Not Applicable

BACKGROUND

Field of Invention

This invention relates to water sterilization, and specifically to water sterilization using solar energy.

Description of Prior Art

Access to safe drinking water is a life or death problem for many people in the world, not only in developing countries, but also areas of developed countries after natural disasters. Often, the problem is not a lack of water, but that the available water may contain pathogens, making it dangerous to consume. A variety of means exist that render questionable water safe to drink.

Sub-micron filtering, such as the hand-operated devices used by hikers, are reasonably effective at removing bacteria and protozoa, and when combined with chemical treatment for killing viruses, such as iodine and chlorine, can provide safe potable water. Both have drawbacks, however, since the micro-particle filters have finite lifetimes, and the chemicals shelf-lives.

A number of approaches that use solar energy for sterilizing drinking water have been proposed. One method is to use the sun's heat to distil, i.e., evaporate and condense, impure water, whereby the micro-organisms are left behind. U.S. Pat. Nos. 3,655,517, 4,219,387, and 5,053,110 describe such means. Although purification by distillation provides high assurance of germ-free drinking water, the process is slow, and produces a relatively small quantity of purified water for a given size of apparatus.

Another approach, for example as described in U.S. Pat. No. 4,978,458, uses the direct application of the ultra-violet component of sunlight for destroying micro-organisms. Although it has been shown that high levels of ultra-violet light, specifically the short-wave UV-C component, can be effective in killing micro-organisms, the water to be treated must be clear, virtually completely free of non-harmful contaminants, such as dust and residual organic matter, since pathogens could otherwise be shielded from the ultra-violet radiation. Additionally, there is always the question of how much exposure and for how long. Since the sun's intensity varies greatly by season and density of water vapor in the air, the consumer of the treated water is left with a concern that they are ingesting harmful organisms.

The traditional and effective approach to sterilizing drinking water is simple boiling. The only required components are a metal container and a flame. The average person requires at least two liters of water per day, and more if living in a hot climate. The traditional approach to purifying water by boiling is to heat the required amount, e.g., two liters, until a roiling boil occurs, and then allow the water to continue to boil for some period of time to ensure complete sterilization. This approach is effective when using a fire and an abundance of fuel, but there are times when fuel for a fire is not available, and since the sun's energy is not reliant on a functioning power grid, this free source can provide an alternative. U.S. Pat. No. 5,676,128 describes a device that can use solar energy to heat a fixed quantity of liquid for the purpose of sterilization.

The traditional approach of boiling the desired quantity of water has limitations when operating with solar energy, however. On a clear mid-summer day, when the sun is high in the sky, sunlight delivers approximately 100 Watts of energy per square foot. The average over the year is significantly lower. An average firewood log, ¼ cubic foot, contains 45,000 BTUs, or about 13,000 Watt/hours. This means that in order to gain the same amount of heat as burning one fireplace log, a solar collector that is over a dozen feet in diameter would have to collect direct summer sunlight for one full hour. Clearly, compared to a camp fire, solar energy is a weak contender.

A practical-sized emergency solar collector would be, for example, eighteen inches in diameter. In ideal summer sunlight conditions, this practical-sized solar collector would require over an hour to deliver enough heat to boil two liters of water. However, this assumes not only ideal sunlight conditions, but ideal transfer of sunlight energy to the water, implying one hundred percent absorption and no subsequent heat loss. In practical application, two liters of water would need significantly more than one hour of uninterrupted sunshine.

Other than in a desert, uninterrupted sunshine is not the norm. Although temperate areas of the country do periodically enjoy clear sunshine weather, in an emergency situation, one does not have the luxury of waiting for the weather to change. In conditions of weak or sporadic sunshine, heat loss is the bane of using solar energy to boil large liter-quantities of water. The higher the water temperature, the greater the heat loss; the closer the water approaches boiling, the less likely that boiling will be achieved if the solar energy is weakened or interrupted. Additionally, sterilizing guidelines recommend a roiling boil for several minutes, so even if the two-liter container of water begins to boil, unless it achieves full roil, one is left wondering how long is sufficient.

Full boiling is important for two reasons: 1) the roil of boiling water is a visible indication of successful sterilization, and 2) the roil circulates the water, ensuring an equilibrium of boiling temperature throughout the entire contents. Regarding the second point, the reason boiling guidelines recommend boiling water for several minutes in order to ensure safe drinking is not necessarily that it takes that long to kill the micro-organisms, but simply that this better ensures that the entire contents have achieved boiling temperature.

When used for sterilization, boiling is an all-or-nothing proposition. In situations with less than ideal sunshine, a full day could be spent fruitlessly trying to bring two liters of water to boil. An obvious answer to this problem would be to boil smaller quantities at a time. At the end of the same mediocre sunshine day, one might come away with one liter instead of the desired two, but one liter is far better than none, and that one liter could mean the difference over time between life and death.

The downside of boiling small quantities is that this requires continuous monitoring and management, at the very time when emergency circumstances may well require other critical attention. The ultimate answer would be to have a means to boil small quantities of water automatically in succession, where, with no monitoring, the result is delivered confidently sterile.

SUMMARY OF THE INVENTION

In accordance with the present invention, a method for sterilizing water in order to render it safe for drinking uses solar energy to boil a quantity of water incrementally.

A first check valve allows untreated water from a reservoir to flow into a boiling chamber, upon which is applied focused energy from the sun, causing the untreated water to boil. A second check valve below the boiling chamber then allows the heated, sterilized water to flow out due to pressure resulting from boiling, while the first check valve above the boiling chamber prevents the boiling water from flowing upwards towards a water reservoir. Once the boiling water has evacuated the boiling chamber, the first check valve then allows new, untreated water to flow into the chamber from the water reservoir, where it is contained by the now-closed second lower check valve. The two check valves open in response to different pressures, whereby the second, lower, check valve requires more pressure than that of the first, upper, check valve. As a result, once the boiling chamber is evacuated due to boiling pressure, new untreated water flows in, and remains in the boiling chamber due to the closed second lower check valve.

Thus, the energy of the sun powers the repeated cycle of boiling and refilling, effecting the sterilization of a quantity of water as determined by the available sunlight, whether continuous, or interrupted by clouds. Further, the process proceeds automatically, without human monitoring or intervention.

DETAILED DESCRIPTION OF THE INVENTION

Figure 1:
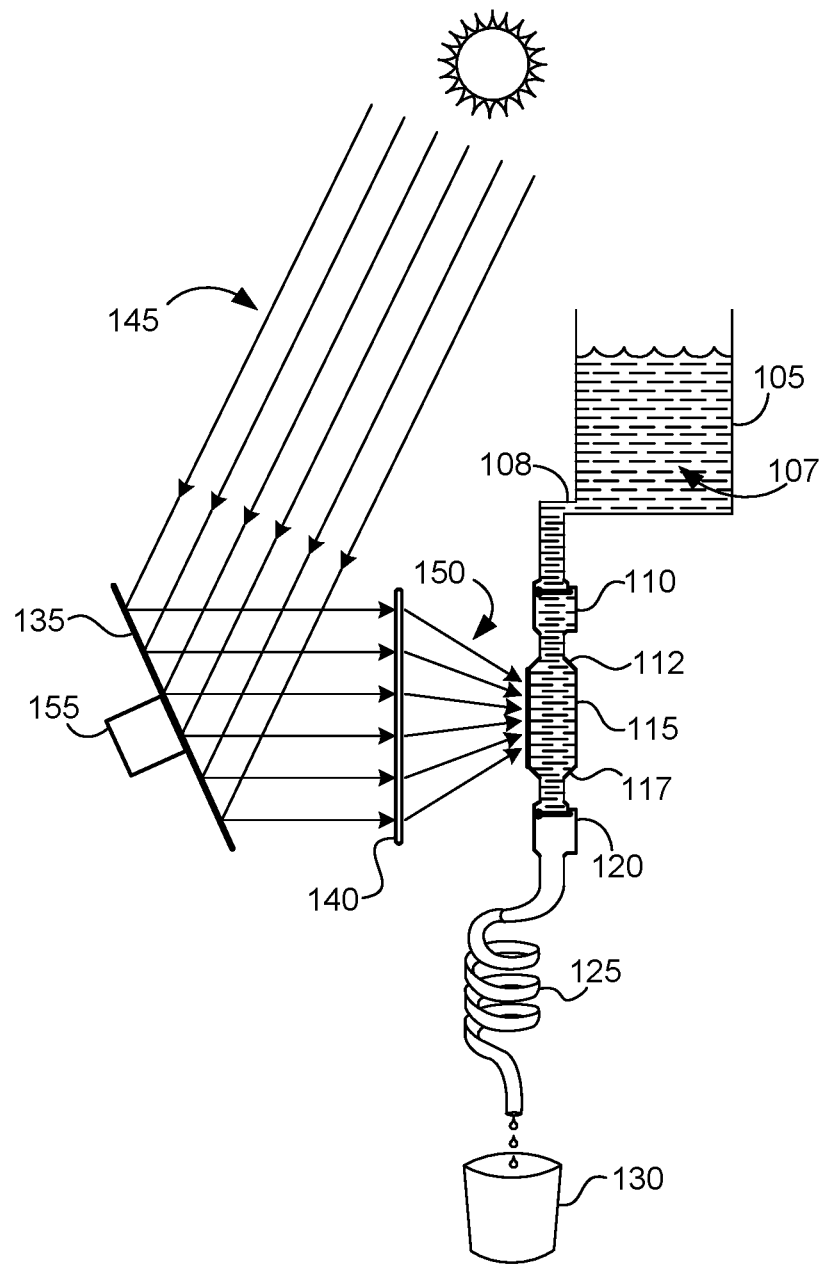
FIG. 1 shows an embodiment of the components comprising the preferred embodiment of the solar sterilizer.

Components Comprising the Preferred Embodiment, FIG. 1

FIG. 1 shows an embodiment of the solar water sterilizer. Water reservoir 105 holds untreated water 107 to be sterilized. Gravity induces the untreated water to flow out of the reservoir through outlet port 108 and down through upper check valve 110, and into upper port 112 of the boiling assembly 115, where it is contained by lower check valve 120. Once boiling due to focused solar energy 150, the sterilized water and steam then flows out through lower port 117 of the boiling assembly and down through check valve 120, and through condenser 125, where the steam is converted back to water, and the final sterilized water is captured in collection container 130.

Check valves 110 and 120 allow flow in one direction only, from the inlet side to the outlet side, and only once the fluid's pressure rises above a defined threshold called the cracking pressure. As will be explained later, a key aspect of the invention is that check valves 110 and 120 are chosen such that each exhibit different, advantageous cracking pressures.

Flat mirror 135, mounted on support gimbal 155, collects and redirects sunlight onto fresnel lens 140, which focuses solar energy. The fresnel lens is fixed in place, whereas the mirror is made to rotate in order to track the apparent progress of the sun across the sky, as explained later.

Figure 2C:
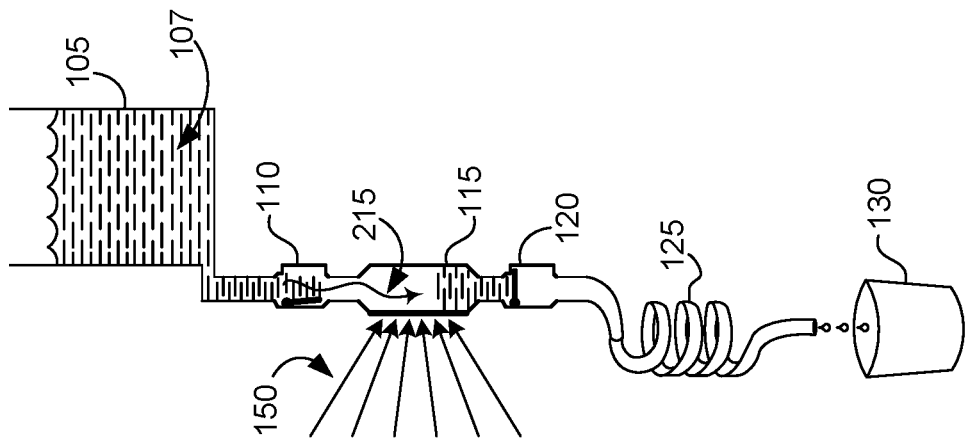
FIG. 2c illustrates the third of three stages of operation, whereby a next increment of untreated water is loaded in preparation for boiling.
Figure 2B:
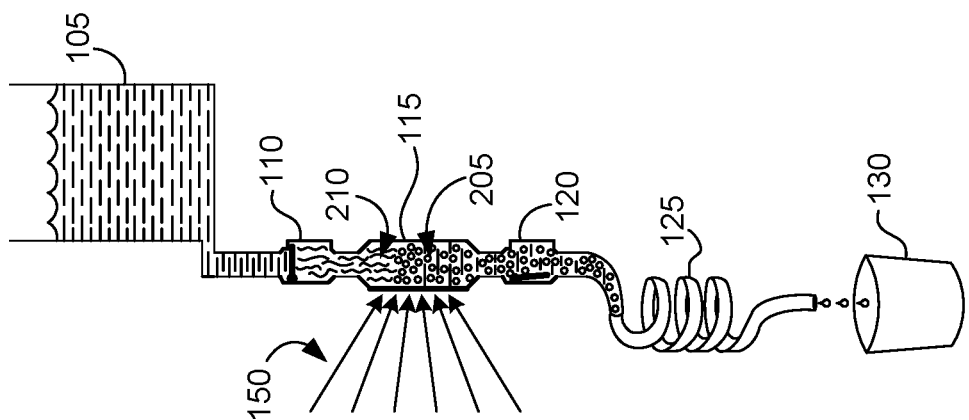
FIG. 2b illustrates the second of three stages of operation, whereby pressure resulting from the boiling water allows exit from containment.
Figure 2A:
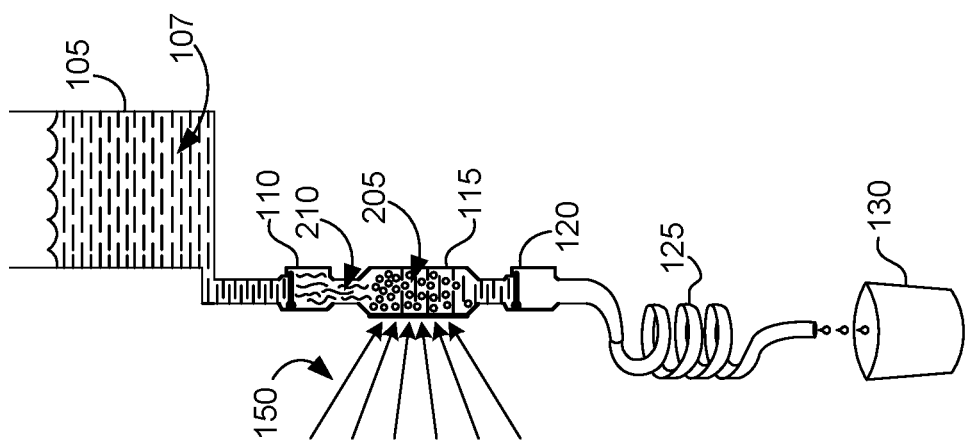
FIG. 2a illustrates the first of three stages of operation of the solar sterilizer, whereby water is contained and heated to boiling.

Phases of Sterilization Operation, FIG. 2a-2c

When the untreated water 107 of FIG. 1 has filled the boiling assembly 115, upper check valve 110 closes, since the water pressure above and below it are now equal. As shown in FIG. 2a, heat from focused solar energy 150 then raises the temperature of the water 205 in the boiling assembly 115 until it begins to boil, creating steam 210. As shown in FIG. 2b, the steam 210 creates pressure in the area between closed check valves 110 and 120, forcing check valve 120 to open, allowing boiling water 205 to drain down into the condensation coil 125, where remnant steam is converted back to water, and finally into the collection container 130.

Once the pressure created by the boiling water 205 is relieved in the evacuated boiling assembly 115, the lower check valve 120 closes, and, as illustrated in FIG. 2c, gravity-induced pressure from the untreated water 107 in water reservoir 105 causes upper check valve 110 to open, allowing untreated water 107 to flow downward, filling the boiling assembly 115.

Once the boiling assembly is filled with untreated water, and water pressure above and below check valve 110 is essentially equal, check valve 110 closes, thus completing the sterilizing phases, as the newly entered untreated water begins to be heated.

Figure 3:
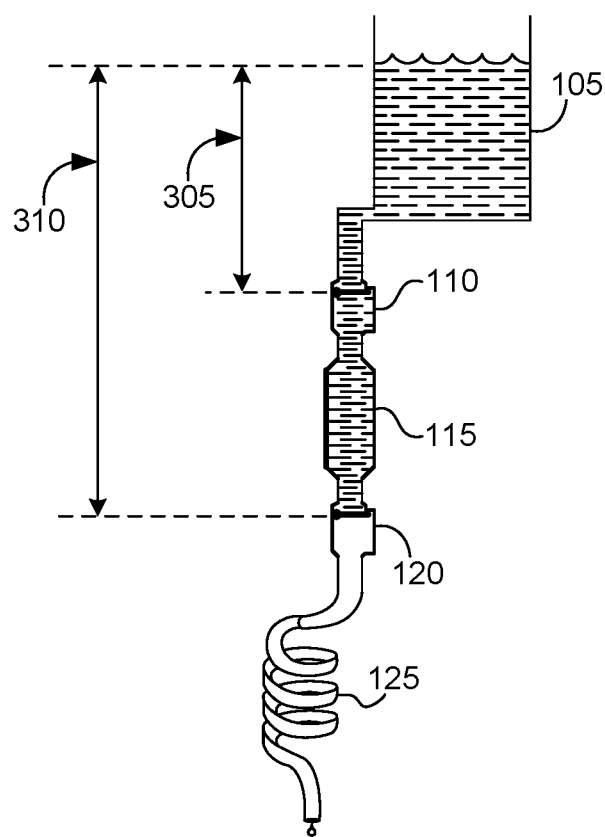
FIG. 3 illustrates the relative difference in gravity-induced water pressure between the two check valves, a key enabling feature of the invention.

Difference in Water Pressure, FIG. 3

The cracking pressure of upper valve 110 must be less than that of the gravity-induced water pressure above it in order for untreated water to refill the boiling assembly in the third phase shown in FIG. 2c. Further, in order for the three phases of operation to proceed as just described, lower check valve 120 must have a larger cracking pressure than the gravity-induced pressure above it, otherwise the gravity-induced water pressure that forced upper valve 110 to open once the boiling assembly has been evacuated would also force lower valve 120 to open, and the water in the water reservoir would simply flow continuously through without boiling.

As is known, hydrostatic water pressure induced by gravity is proportional to the depth of the water. Regardless of the shape of the path or diameters of the conduits, the gravity-induced static water pressure measured at any point is directly related to the vertical distance from the surface of the water to the point where the pressure is measured. Thus, in FIG. 3 the gravity-induced water pressure at the upper check valve 110 is dictated by distance 305, while the gravity-induced water pressure at the lower check valve 120 is dictated by distance 310. Therefore, for example, if distance 310 is twice that of distance 305, then the static gravity-induced water pressure will be twice as great at check valve 120 as that at check valve 110.

Static water pressure induced by gravity is known to increase by one atmosphere—i.e., 14.5 psi—per every ten meters of depth. Thus, the cracking pressure of upper check valve 110 must be less than 14.5 psi times the distance 305, as measured in tens of meters, while the cracking pressure of lower check valve 120 must be greater than 14.5 psi times the distance 310.

Figure 4A:
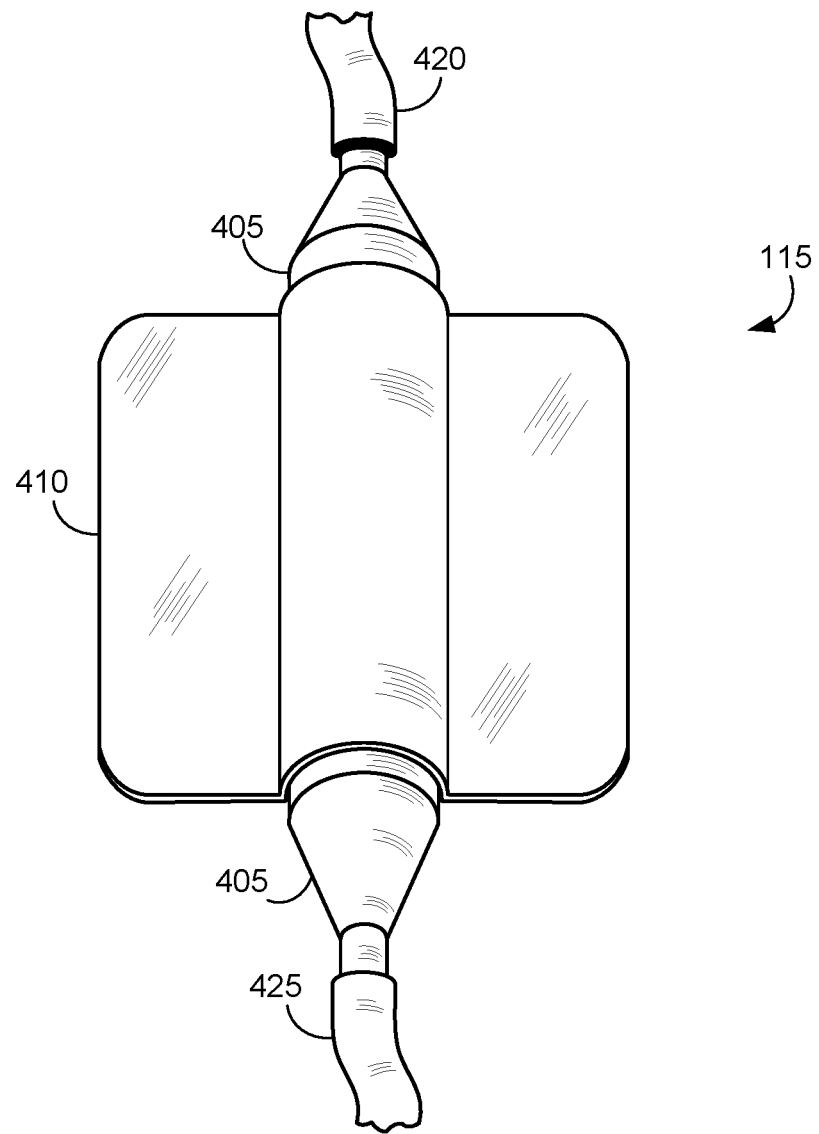
FIG. 4a shows an assembled boiling assembly, a component in each previous figure.
Figure 4B:
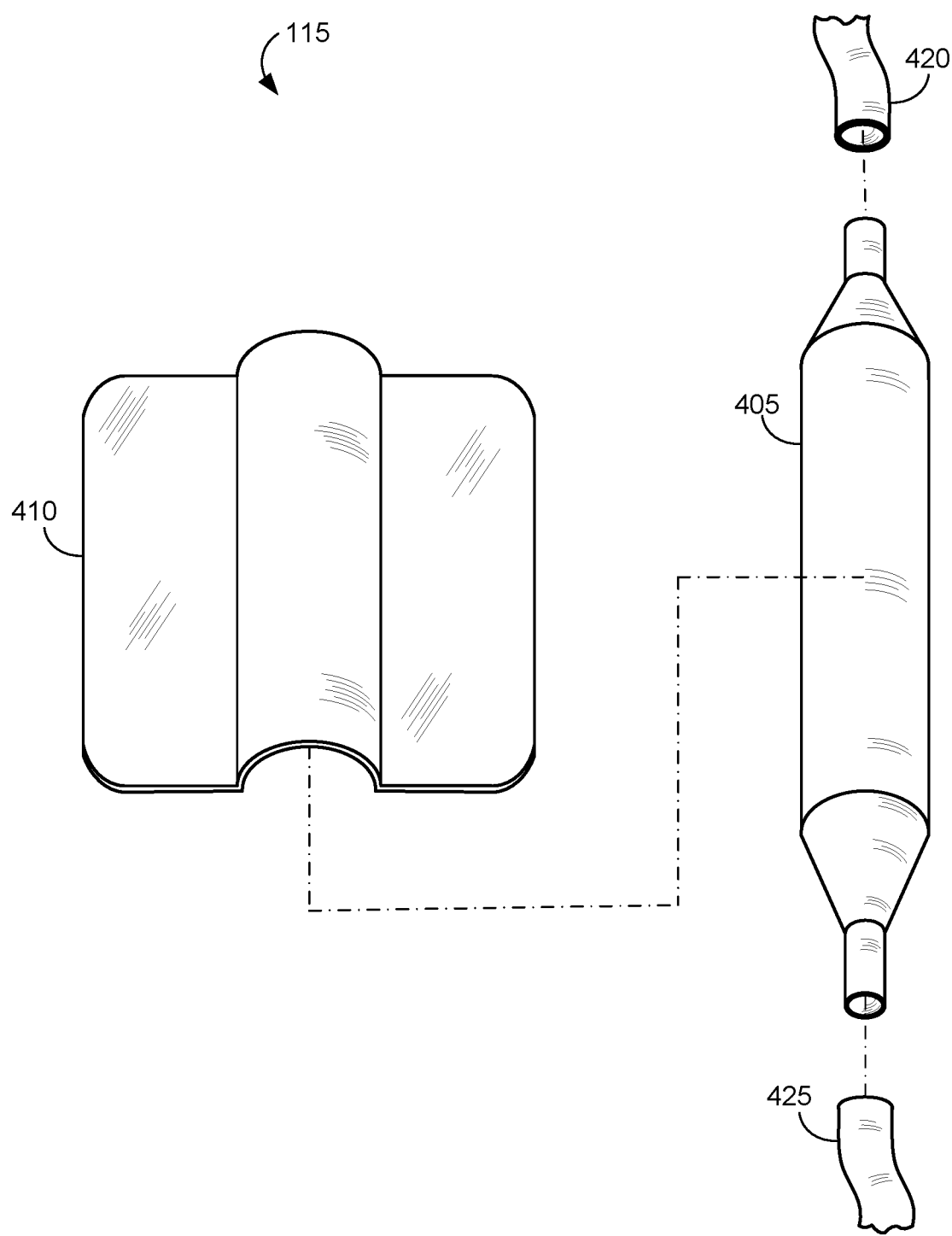
FIG. 4b shows the boiling assembly disassembled.

Boiling Assembly, FIGS. 4a and 4b

FIG. 4a shows a detailed illustration of the boiling assembly 115, while FIG. 4b shows the disassembled component parts. Boiling chamber 405 is a cylindrical metal container that holds each incremental portion of untreated water until heated to boiling. Incoming untreated water is provided through tubing 420, the other end of which is attached to upper check valve 110 shown in FIGS. 1 through 3. Boiling sterilized water exits through tubing 425, the other end of which is attached to lower check valve 120, also shown in FIGS. 1 through 3. Both of tubes 420 and 425 are kept as short as practical in order to ensure that the whole of the incremental portion of untreated water between check valves 110 and 120 reaches a sufficiently high temperature to ensure that all pathogens are destroyed. It will be understood that, although the preferred embodiment uses short tubes to connect the boiling assembly to the check valves, an alternative embodiment could attach the valves directly to the boiling assembly.

Solar absorber 410 is a metal plate molded to fit the boiling chamber 405 along its length. The solar absorber plate allows relaxation of the focus precision of solar energy 150 shown in FIG. 1, and is only large enough for that purpose, since excess area would cause an undesirable amount of heat to radiate away into the air. The solar absorber plate is dark in color, e.g., painted black, in order to maximize absorbed solar radiation. Thermal paste (not shown) lies between solar absorber 410 and boiling chamber 405, assisting the flow of heat to the boiling chamber, and thus to the water inside.

Although the preferred embodiment uses a cylindrical boiling chamber, it will be understood that any shape container would suffice, as long as sufficient surface area is afforded access to the heat delivered via solar energy.

Figure 5:
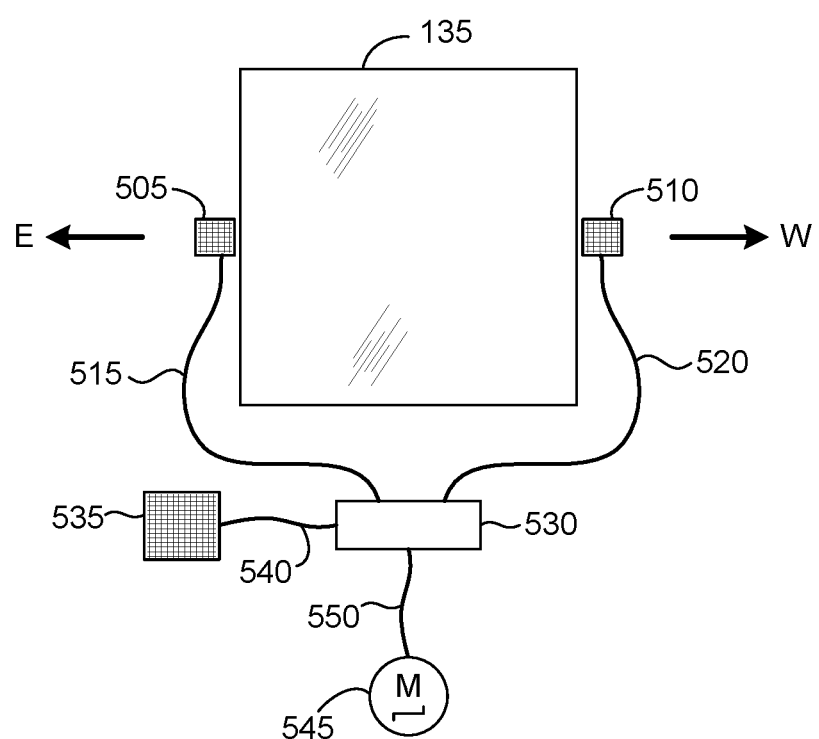
FIG. 5 shows a mirror sun-tracking means.

Means for Tracking the Sun With the Mirror, FIG. 5

FIG. 5 shows the means used in the preferred embodiment for tracking the sun with mirror 135 of FIG. 1, whereby the mirror is mounted on dual-axis gimbal support 155. One gimbal axis is positioned to be oriented north and south, so that the mirror can be tilted east and west. The other gimbal axis is oriented east and west, so that the mirror can be tilted north and south. The user manually tilts the mirror along the two axis such that the focused light of the sun shines on the boiling assembly 115 of FIG. 1. Since the sun's apparent movement follows a path across the sky in an east-to-west arc, if the resulting north/south tilt—i.e., the east/west gimbal axis—is locked into place, then the mirror need only be tilted along the north/south axis to keep the focused sunlight on the boiling assembly.

Stepper motor 545 of FIG. 5 implements this north/south axis tilt by coupling its axis to that of the north/south axis of the gimbal support 155. As the sun's apparent position moves westward across the sky, and the mirror's light thus moves off the fresnel lens in an eastward direction as shown on FIG. 5, the mirror's light begins to shine on light sensor 505. Mirror controller 530, powered by photovoltaic cell 535 and connecting wires 540, is connected to light sensors 505 and 510 by signal wires 515 and 520, respectively, and controls stepper motor 510 via control wires 550. When mirror controller 530 detects the differential in signal level between eastward light sensor 505 and westward light sensor 510 as the suns light moves onto light sensor 505, it activates the stepper motor to tilt the mirror westward until the signal levels of light sensors 505 and 510 are again approximately equal, indicating that the mirror's light is again centered on the fresnel lends, and thus also on the boiling assembly.

In this way, the mirror is made to automatically tilt and follow the apparent track of the sun across the sky.

Figure 6:
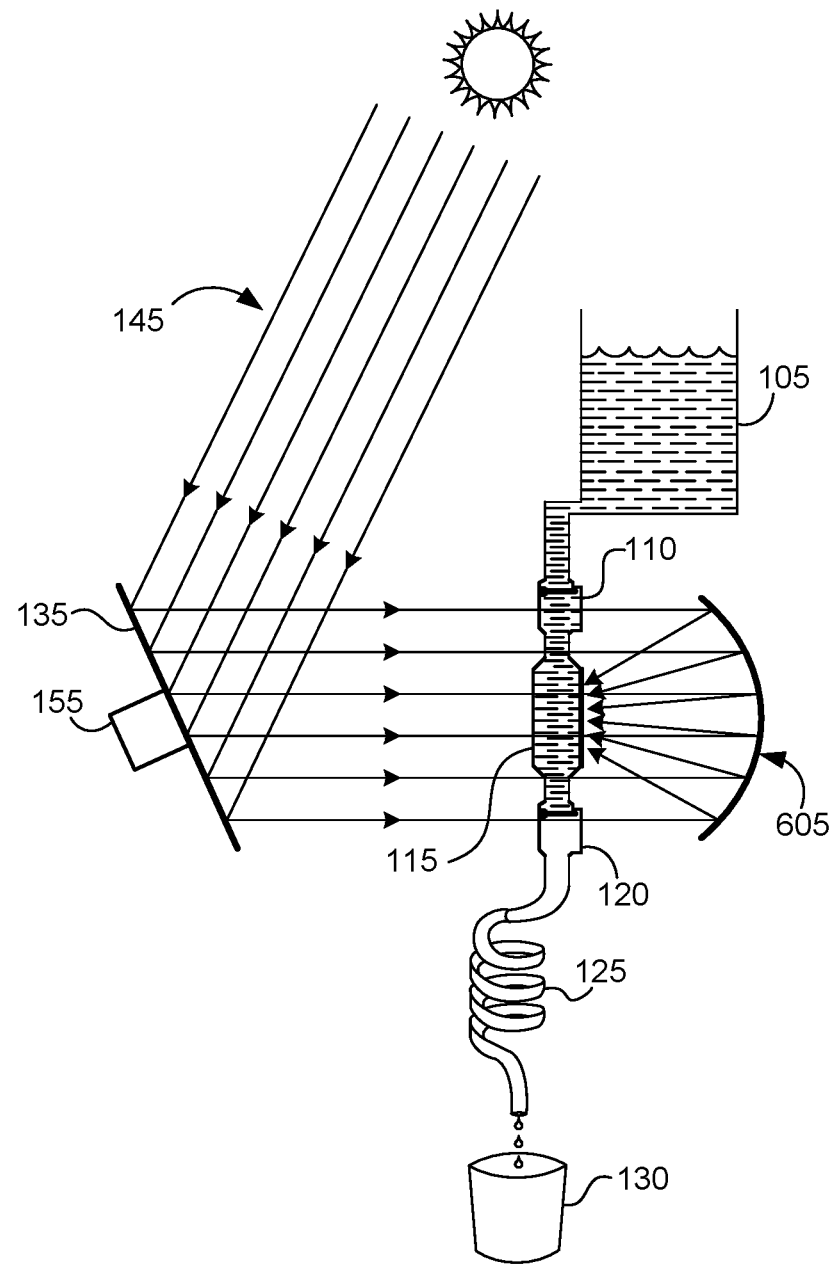
FIG. 6 shows an alternate embodiment of the solar sterilizer, whereby solar energy is collected and focused using a parabolic reflector.

Alternate Embodiment Using a Parabolic Mirror, FIG. 6

FIG. 6. shows an alternative embodiment to that of FIG. 1. Whereas the preferred embodiment uses a fixed fresnel lens to concentrate and focus solar energy, FIG. 6 shows parabolic shaped reflector 605 used for the purpose instead. Like the fresnel lens of the preferred embodiment, parabolic reflector 605 is fixed in place, while mirror 135 rotates to track the sun. Parabolic reflectors have advantage over fresnel lens of similar size in that they are more efficient, meaning that less solar energy is lost due to absorption and scattering. Their disadvantage over a fresnel lens is that they are generally more expensive. Additionally, some degree of solar blockage is encountered due to the valves and boiling assembly, as can be seen in FIG. 6.

Conclusion, Ramifications, and Scope

It can be seen that by the means described above, a useable quantity of potable water can be sterilized by incrementally heating smaller quantities of questionable water such that all the water delivered to the collection container has reached boiling temperature, thus destroying any pathogens. Due to the inventive arrangement of paired check valves, the succession of incremental sterilization can proceed automatically without the user's intervention, thus freeing up hours of time.

The various figures show two check valves and a boiling chamber arranged in a vertical line, but it would be understood that any arrangement will suffice, so long as the check valve closest to the water reservoir opens to the gravity-induced pressure of the water, whereas the check valve farthest from the water reservoir does not open to gravity-induced water pressure at its location, but opens only to the greater pressure created by the steam produced when each incremental amount of water begins to boil.

The operation of the embodiments has been described in general terms, and one skilled in the art will recognize that the constituent components can be implemented in a variety of ways, including various shapes and sizes of solar absorber component of the boiling assembly.

The various nomenclatures used in this invention are not intended in any way to limit the scope of the invention; and thus, there is no intent of excluding equivalents, but on the contrary it is intended to cover any and all equivalents that may be employed without departing from the spirit and scope of the invention.

I claim:

1. A water sterilization system that boils water in increments, comprising:
   a) a water reservoir with an outlet connected to an inlet side of a first check valve,
      i) the cracking pressure of said first check valve is selected such that the gravity-induced pressure of water from said reservoir allows water to flow past an outlet of said first check valve;
   b) an outlet of said first check valve is connected to a first port of a boiling chamber, said chamber including means to absorb focused solar energy;
   c) a second port of said boiling chamber is connected to the inlet side of a second check valve;
      i) the cracking pressure of said second check valve is selected such that the gravity-induced pressure of water from said reservoir at the location of said second check valve does not allow water to flow past the outlet of said second check valve;
      ii) the cracking pressure of said second check valve is further selected such that the pressure of steam created by water boiling in said boiling chamber allows said boiling water to flow past the outlet of said second check valve;
   d) a means to collect and focus solar energy onto said boiling chamber, whereby, water from said reservoir can be boiled and thus sterilized in increments as said check valves allow water to enter said boiling chamber, and then exit only when boiling.

2. A water sterilization system according to claim 1, wherein said boiling chamber includes a means for absorbing and transferring solar energy to said boiling chamber.

3. A water sterilization system according to claim 1, wherein a flat mirror collects and redirects sunlight for said solar energy collection and focusing means.

4. A water sterilization system according to claim 3, wherein said flat mirror is mounted on a gimbal.

5. A water sterilization system according to claim 1, wherein said means to collect and focus solar energy includes at least one fresnel lens.

6. A water sterilization system according to claim 1, wherein said means to collect and focus solar energy includes at least one parabolic mirror.

7. A water sterilization system according to claim 1, wherein said means to collect and focus solar energy includes a means to automatically track the apparent movement of the sun across the sky.

8. A water sterilization system according to claim 7, wherein said means to automatically track the apparent movement of the sun includes light sensors for detecting that the said apparent movement of the sun has caused the said solar energy to move away from said solar collecting and focusing means.

9. A water sterilization system according to claim 7, wherein said means to automatically track the apparent movement of the sun includes a photovoltaic cell to power control circuitry.

* * * * *